United States Patent [19]

Skeist et al.

[11] 4,311,942
[45] * Jan. 19, 1982

[54] COMPACT FLUORESCENT LAMP AND METHOD AND MEANS FOR MAGNETIC ARC SPREADING

[75] Inventors: S. Merrill Skeist, Brookville; Leo Gross, Bayside, both of N.Y.

[73] Assignee: Spellman High Voltage Electronics Corp., Plainview, N.Y.

[*] Notice: The portion of the term of this patent subsequent to Feb. 4, 1997, has been disclaimed.

[21] Appl. No.: 45,589

[22] Filed: Jun. 4, 1979

Related U.S. Application Data

[63] Continuation-in-part of Ser. No. 834,651, Sep. 21, 1977, Pat. No. 4,187,446, and a continuation-in-part of Ser. No. 935,481, Aug. 21, 1978, abandoned.

[51] Int. Cl.³ .................................... H05B 41/14
[52] U.S. Cl. ........................ 315/62; 313/156; 313/161; 315/54; 315/71; 315/283; 315/347
[58] Field of Search .............. 315/41, 54, 57, 59, 315/62, 267, 71, 283, 289, 347, 348, DIG. 5; 313/153, 154, 156, 161

[56] References Cited

U.S. PATENT DOCUMENTS

| | | | |
|---|---|---|---|
| 560,476 | 5/1896 | Coffin | 313/153 |
| 2,087,753 | 7/1937 | Davies | 313/156 |
| 2,164,915 | 7/1939 | Hall, Jr. | 315/57 X |
| 2,306,628 | 12/1942 | Lemmers | 313/204 |
| 2,406,146 | 8/1946 | Holmes | 313/204 |
| 2,411,510 | 11/1946 | Abadie | 315/62 X |
| 2,501,375 | 3/1950 | Breadner et al. | 313/204 X |
| 2,654,040 | 9/1953 | Batchelder | 313/154 X |
| 3,059,137 | 10/1962 | Reaves | 313/204 |
| 3,296,480 | 1/1967 | Walz | 313/204 |
| 3,335,311 | 8/1967 | Kim | 313/155 |
| 3,369,140 | 2/1968 | Furth | 313/161 X |
| 3,440,542 | 4/1969 | Gautney | 343/788 X |
| 3,508,103 | 4/1970 | Young | 313/493 |
| 3,521,120 | 7/1970 | Anderson | 315/57 |
| 3,562,583 | 2/1971 | Zollweg et al. | 313/161 |
| 3,611,009 | 10/1971 | McNeil | 315/57 |
| 3,683,389 | 8/1972 | Hollis | 343/788 |
| 3,721,989 | 3/1973 | Christensen | 343/788 X |
| 3,723,782 | 3/1973 | Thomsen | 313/155 X |
| 3,848,150 | 11/1974 | Taxil et al. | 313/204 |
| 3,899,712 | 8/1975 | Witting | 313/493 |
| 3,916,034 | 10/1975 | Tsuchimoto | 313/155 X |
| 4,001,626 | 1/1977 | Drop et al. | 313/155 X |
| 4,187,446 | 2/1980 | Gross et al. | 315/267 |

*Primary Examiner*—Eugene La Roche
*Attorney, Agent, or Firm*—Kenneth S. Goldfarb

[57] ABSTRACT

A compact fluorescent lamp with a screw-in plug to fit conventional screw sockets which operates at 20-30 watts and provides the lumen output of a 75-100 watt lamp. The lamp is essentially a hollow cylinder with a glass envelope for the two outer walls. The space between the two outer walls is partitioned to constrain the arc discharge to follow a designated path around the inner surface of the lamp. Efficiency is promoted by novel ballast design. The screw-in fluorescent lamp contains a coil in the center of the lamp which creates a diverging magnetic field which causes the arc discharge to spread and may also serve the dual purpose of limiting arc current. Arc spreading coils of several designs are disclosed to provide oriented diverging magnetic fields, rotating diverging magnetic fields and magnetic fields shaped to the lamp envelope with which they are employed.

14 Claims, 16 Drawing Figures

COMPACT FLUORESCENT LAMP AND METHOD AND MEANS FOR MAGNETIC ARC SPREADING

REFERENCE TO RELATED APPLICATION

This application is a continuation-in-part of United States application Ser. No. 834,651, now U.S. Pat. No. 4,187,446, issued Feb. 5, 1980, which application had been submitted Sept. 21, 1977, and is a continuation-in-part of U.S. application Ser. No. 935,481, submitted Aug. 21, 1978, now abandoned.

BACKGROUND OF THE INVENTION

1. FIELD OF THE INVENTION

The present invention relates to electric discharge lamps which have fluorescent material deposited on the envelope containing the discharge path, that is, fluorescent lamps.

2. DESCRIPTION OF THE PRIOR ART

Considerable research effort has been expended since fluorescent lamps became available, to develop a compact fluorescent light source with a screw-in plug as replacement for standard incandescent lamps. Inventive ingenuity has produced lamp designs not now being marketed because of manufacturing difficulties to mass produce due to involved internal shapes and an inability to lay down uniform luminescent coatings.

A recent U.S. Pat. No. 3,899,712, wraps a helical tube around a cone. The tube is fabricated from two pieces: a depressed groove in the cone, and a mating piece joined to the groove to complete the helical tube. This approach is slightly simpler than that taken by U.S. Pat. No. 3,296,480 where the helical path is formed by three elements: an inside and an outside cone, and an internal barrier forming the helix. U.S. Pat. No. 2,501,375 is similarly constructed, but more convoluted, in that the tube is led into the interior of the form on which the helical tube is wound. The forming of the tube and sealing of the two halves of the tube along the longitudinal edges are expensive and a major obstacle in manufacturing, fraught with prohibitive shrinkage.

U.S. Pat. No. 3,611,009 creates an annular fluorescent between glass panels with a ballast above, both held in a metal fixture with a screw-in plug. The discharge energizes the phosphor at its maximum lumen output for a limited area near the arc. U.S. Pat. No. 2,406,146 explored various designs by which the arc discharge could be constrained to a zigzag path, but did not address itself to manufacturing ease or to providing a lamp with a screw-in plug.

Somewhat earlier, U.S. Pat. No. 3,059,137 described a circline toroidal fluorescent with ballast and starter within the toroid, the fixture having a screw-in plug.

Another approach, U.S. Pat. No. 3,521,120, to a screw-in lamp, avoids the arc discharge and energizes the gas with a radio frequency field. To get sufficient energy into the lamp, the frequency is quite high. As a result, radio frequency interference creates problems severely limiting its application. There is also the additional complexity of generating sufficient wattage at frequencies much higher than the 60 Hz power line frequency.

Fluorescent panels have been described with partitions to confine the arc discharge to a zigzag path, as in U.S. Pat. No. 3,848,150, which uses T-shaped baffles in a cylindrical tube. Straight-edge partitions are used in U.S. Pat. No. 3,508,103. An early version of applying partitions is described in U.S. Pat. No. 2,306,628. The common difficulty in fabricating these devices is insuring a leakproof seal between the edges of the partitions and the glass envelope, especially since these partitions are added as a separate part to be joined to one or both walls of the envelope in the manufacturing process, a difficult, expensive, and not uniformly successful technique.

Coffin, in 1896, describes in U.S. Pat. No. 560,476, a coil around an electrode of a carbon arc lamp which stabilizes and confines the arc to reduce flicker. Kim describes that the same phenomenon, wherein an external magnetic coil produces a parallel magnetic field, thereby reducing the flickering and shifting of the glow discharge in a neon glass lamp, the basis of U.S. Pat. No. 3,335,311, issued Aug. 8, 1967. An internal magnet was utilized to accomplish a similar effect in xenon arcs by Thomsen, U.S. Pat. No. 3,723,782, of Mar. 27, 1973. More recently, Drop et al applied a magnetic field to shape the arc discharge in a metal halide lamp, U.S. Pat. No. 4,001,626 of Jan. 4, 1977. Mention must be made of magnetic confinement of plasmas in fusion research in Tokomaks, MHD generator and other devices as described in U.S. Pat. No. 3,916,034, dated Oct. 28, 1975 of Tsuchimoto, and U.S. Pat No. 3,369,140, dated Feb. 13, 1968 of Furth. The references quoted apply magnetic fields to confine an arc or plasma, not disperse the arc as in this invention.

SUMMARY OF THE INVENTION

Accordingly, it is the object of the present invention to provide a fluorescent lamp, a gas discharge device, that is compact, has a screw-in base to fit incandescent lamp sockets, and that can be made with high speed machinery at low cost. Such a fluorescent lamp, a ready replacement for incandescent lamps, will save considerable electrical energy by providing the same luminosity at lower wattage.

It is another important object of the present invention to provide arc spreading coils to mate with screw-in fluorescent lamps and other gas discharge lamps so that such lamps will be energy saving, cost effective replacements for incandescent lamps. The arc spreading coil compels energized atoms, which emit UV light, to move close to the surface of the phosphor of the fluorescent lamp even though that surface may be distant from the arc were it not to be spread by such a coil. Consequently, an object of this invention is the provision of a fluorescent lamp, a double cylinder or globe, with one or more partitions, allowing the design of lamps of varying physical size and wattage, and wherein the arc spreading coil enables the phosphor to be energized to its maximum efficient luminescence.

DETAILED DESCRIPTION OF THE INVENTION

Figure 1:
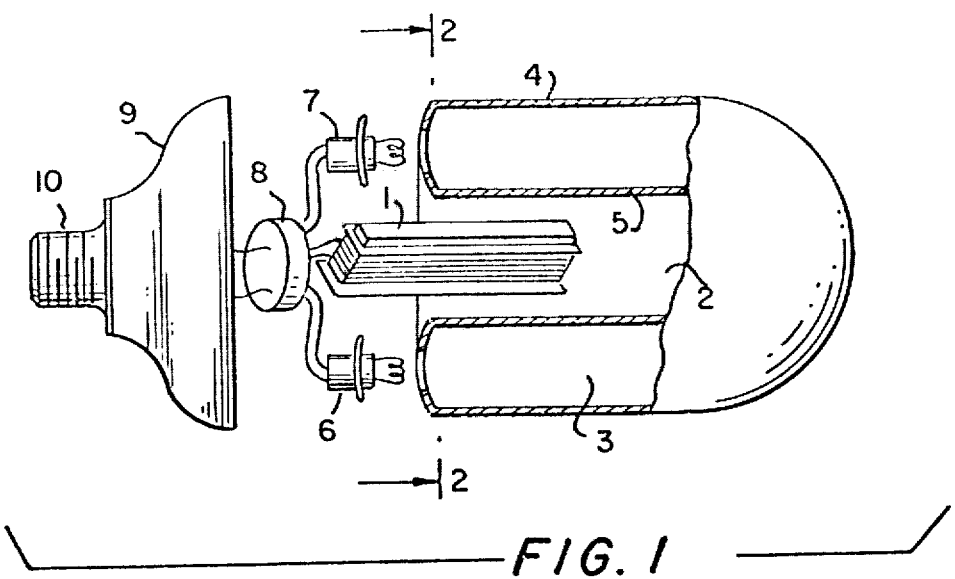
FIG. 1 is a pictorial view of the fluorescent lamp with parts shown in section and having a screw-in base within which arc spreading coils are placed.
Figure 2:
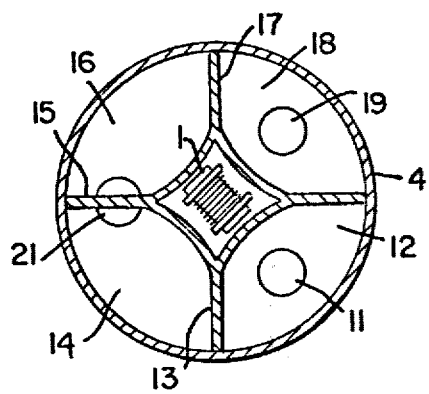
FIG. 2 is a sectional view of a four section lamp taken along the plane of line 2—2 in FIG. 1.
Figure 3:
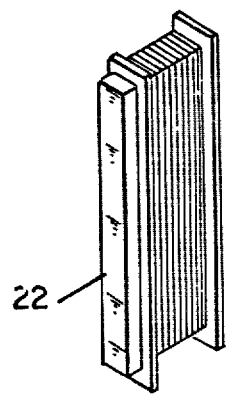
FIG. 3 is a perspective pictorial representation of a simple arc spreading coil within the fluorescent lamp.

With initial reference to FIGS. 1 and 2, an arc spreading coil 1, is inserted into the central cavity 2 of the screw-in fluorescent lamp. The arc discharge is established in the volume 3 of the lamp within the inner and outer phosphored surfaces 4, 5 of the lamp. The arc discharge flows between the filaments 6, 7 and is limited by a ballast, which may be the arc spreading coil 1, and when necessary additional circuitry 8, housed under the bezel 9, connected to the screw-in base 10, of the lamp. The number of partitions can be as few as one or any greater number. A four-section lamp is shown in plan view in FIG. 2, wherein the arc discharge is constrained to follow a zigzag path from the filament electrode 11, downward through chamber 12 and partition 13, which has an opening at the bottom and upward through chamber 14 and over partition 15 which is open at the top, downward through chamber 16 and under partition 17 and up through chamber 18, to filament electrode 19 thus completing the arc discharge path. When the arc spreading coil 1 is not actuated, the cross section of the arc discharge is roughly circular and occupies a limited portion of the volume of the lamp. When the arc spreading coil 1 is energized, a diverging varying magnetic field is created which causes the arc to spread outward, the flow of the current then filling the entire volume of the lamp envelope. Phosphor is applied through ports 11, 19, and 21. Filaments are sealed into ports 11 and 19 when port is sealed shut. The arc spreading coil shown in FIG. 3 is a solenoid with pole faces extending along the axis of the lamp envelope. Such a solenoid is most effective in spreading the arc when oriented so that the poles 22 face the arc discharge, and spreads the arc at right angles to the pole faces. At 60 Hz, the solenoid can be one-half to two-thirds the height of the lamp envelope. The design is adjusted accordingly as the operating frequency of the solenoid and lamp is increased.

The arc spreading coil can simultaneously serve as all or part of the ballast of the fluorescentlamp.

Figure 4:
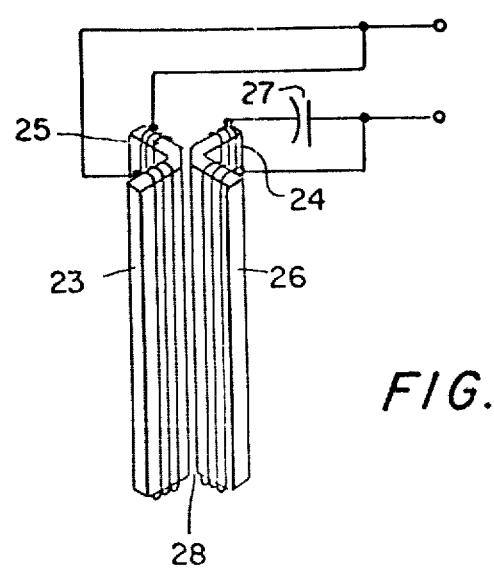
FIG. 4 is a perspective view of a four pole arc spreading coil.

A more radially symmetrical diverging field throughout the volume of the lamp envelope is produced by the arc spreading coil 28 as shown in FIG. 4. Where the core consists of four poles, one a pair, 23, 24 of which is energized approximately 90° out of phase with the other pair 25, 26 of poles due to the action of condenser 27.

Figure 5:
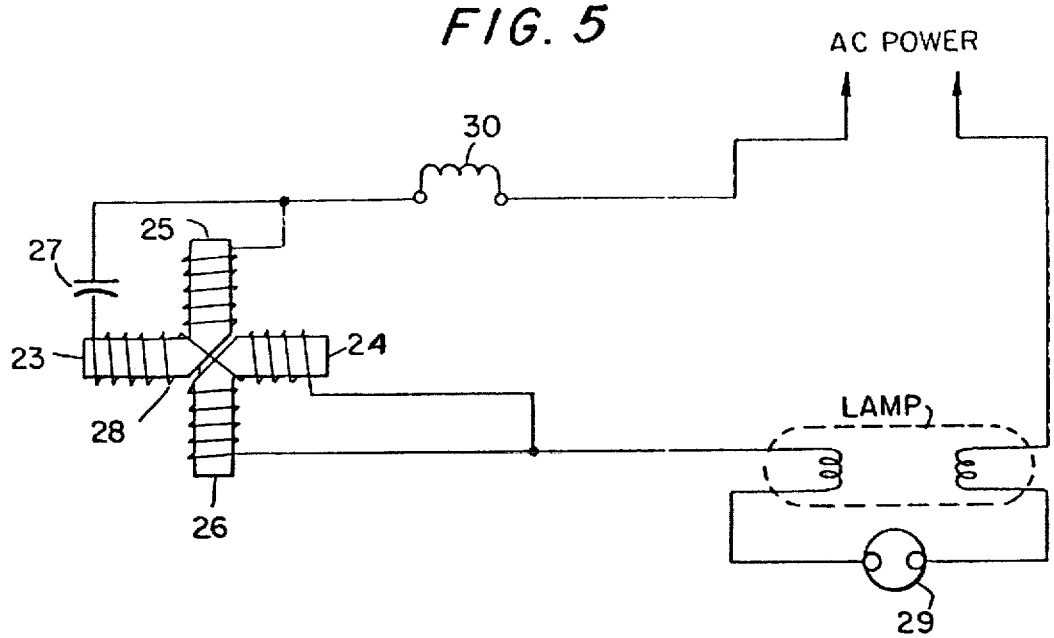
FIG. 5 is a schematic diagram of the arc spreading coil shown in a representative circuit for a screw-in fluorescent lamp.
Figure 6:
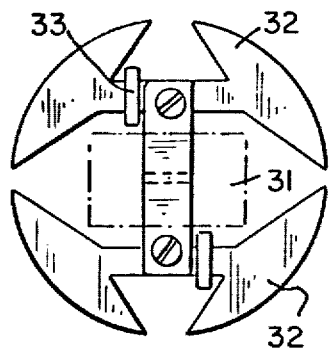
FIG. 6 is a pictorial view of a shaded pole arc spreading coil design.

A schematic circuit is shown in FIG. 5. A rotating magnetic field is created which sweeps through the volume of the lamp at the frequency of the current used to excite the arc spreading coil. Depicted also are the starter 29 and the additional ballast 30 where required. A rotating magnetic field arc spreading coil utilizes shaded poles, shown in cross-section in FIG. 6. The solenoid 32 is mounted on two pole pieces 31. The pole pieces are shaped to cause maximum divergence of the magnetic field around the periphery of the lamp envelope and a shorted turn 33 on each of a pair of poles providing the shading.

Figure 7:
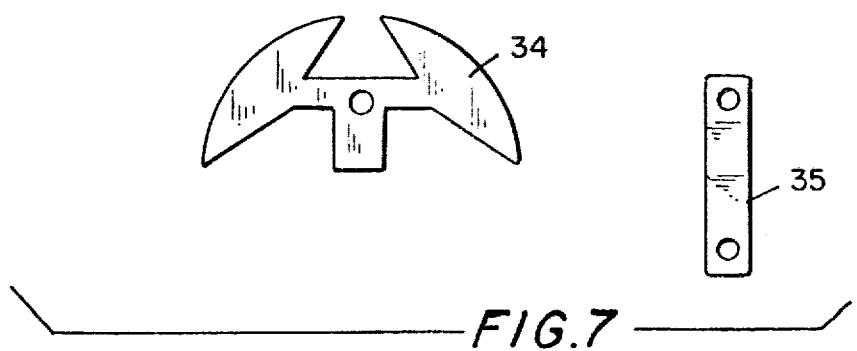
FIG. 7 is an exploded view showing the parts of the shaded pole.

An individual lamination 34 of the pole pieces is shown in FIG. 7 together with the strap 35 to hold two stacks of the laminations in close opposition.

Figure 8:
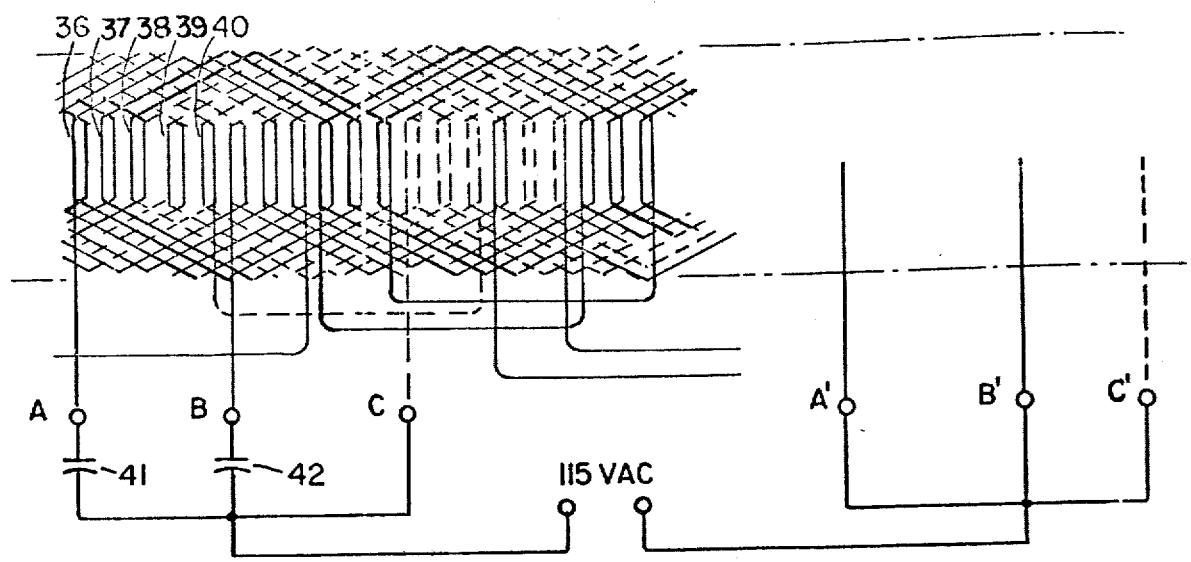
FIG. 8 is a schematic diagram of a uniform amplitude circularly rotating magnetic field arc spreading coil.

Though adequate spreading of the arc is achieved by such circuitry, and orientation of the arc spreading coil within the lamp housing is not required, more precise control can be accomplished with a three phase circular rotating magnetic field. A three phase arc spreading coil is built in the same manner as is a continuously wound three phase armature, where for this coil, the phases are created by appropriate choices of series capacitors. A representation of the manner of winding is shown for such a coil when viewed as if the surface of the core were peeled off and laid flat (see FIG. 8). Groups of turns 36–40 and higher are wound as on an armature. Power input is through phased connections 41, 42, etc.

Figure 9:
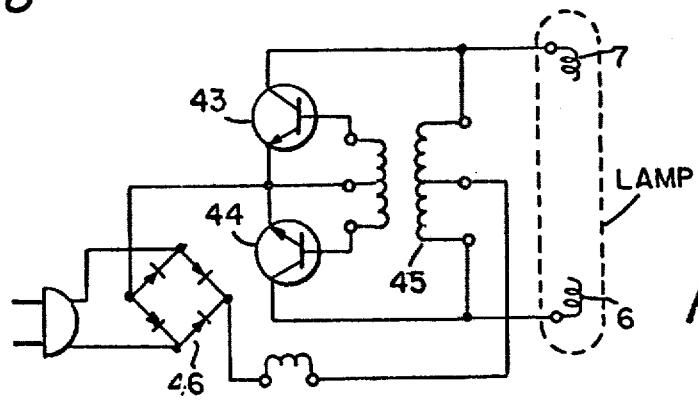
FIG. 9 is a schematic diagram of a circuit to energize an arc spreading coil at frequencies above 20KHz.

Arc spreading coils become more efficient as the operating frequency is increased. A screw-in fluorescent lamp with a high frequency arc spreading coil can be adapted to more replacement situations than its heavier counterpart at a 60Hz line frequency. The aforementioned arc spreading designs are simpler to construct but are relatively unchanged in appearance and function as the line frequency is increased. A solid state circuit producing high frequency power is shown in FIG. 9. It is similar to one of many known to the art for more than twenty years. The oscillator transistors 43, 44 stores energy in the tank coil 45 which are also the arc spreading coil. The oscillator is fed from the power lines directly or by bridge rectifier 46.

Figure 10:
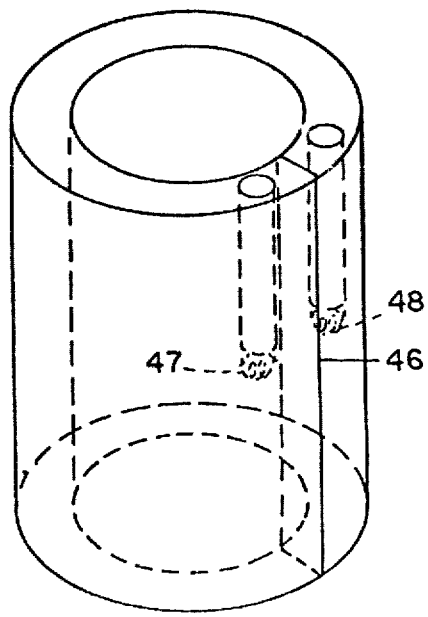
FIG. 10 is a schematic perspective view of a single partition lamp.

An attractive design of both arc spreading coil and lamp envelope is the one partition lamp as shown in FIG. 10. Fabrication is greatly simplified. The partition 46 is a barrier between the filaments 47, 48 which are located close to and on either side of the barrier. The arc discharge follows the shortest path around the lamp when the arc spreading coil is not energized. When the arc spreading coil is energized, light emitting atoms are present throughout the volume of the lamp envelope.

Many different ways to partition the arc spreading fluorescent lamp are feasible. The possible configurations are too numerous to record. Illustrative of possible variations is the design in FIG. 11 et. seq.

Figure 11:
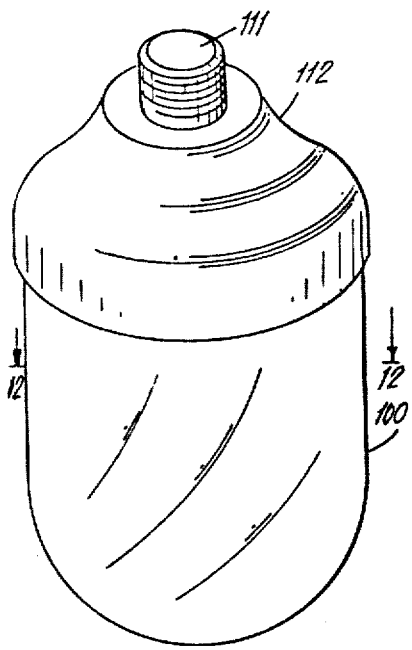
FIG. 11 is a pictorial view of the fluorescent lamp with a screw-in base.
Figure 12:
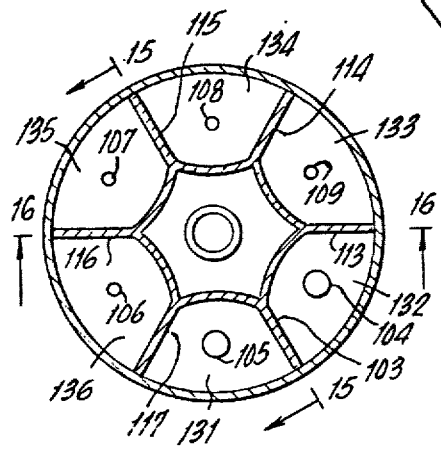
FIG. 12 is a horizontal sectional view, taken along the plane of line 12—12 in FIG. 11 showing filament mountings in a six-section lamp.
Figure 14:
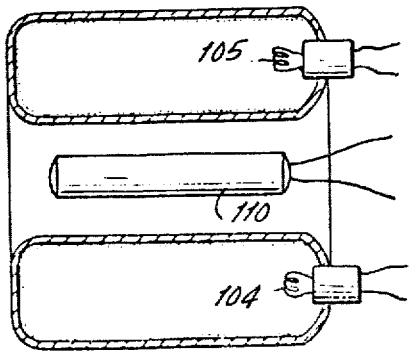
FIG. 14 is a schematic view of an alternative simpler embodiment of the lamp structure, the filaments being shown opposite one another for clarity though they are separated by a single partition in the actual lamps.
Figure 16:
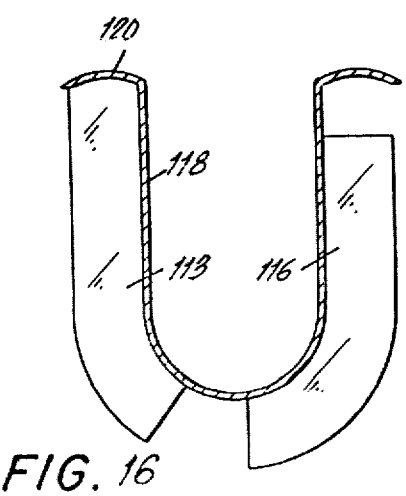

In FIGS. 11 and 12, the general shape of one embodiment of the invention can be seen. The fluorescent lamp comprises a double-walled envelope 100 with a hollow center 101. The interior 102 of the lamp envelope is partially evacuated and carries the arc discharge. The series of partitions 103, 113, 114, 115, 116, and 117 form compartments 131, 132, 133, 134, 135, 136 and constrains the arc to follow a designated path throughout the entire envelope from one filament 104 in compartment 132 to the other filament 105 in compartment 131. The filaments are nominally called electrodes or thermionic cathodes. The number of partitions can be one or any greater number. In the embodiment shown here, the six partitioned chambers 131 through 136 are shown to provide a compact path throughout the envelope, approximately two feet long for a 20-30 watt fluorescent lamp with the luminous output of a 75 to 100 watt incandescent lamp. The size of the envelope and the number of partitions can be adjusted to create a fluorescent lamp of any desired wattage and path length. The lamp envelope has apertures where the filaments are inserted. Other apertures 106, 107, 108, 109 are ports from which the lamp is filled with a phosphor slurry to form the fluorescent coating, which apertures are sealed after the fluorescent coating 122 has been formed. The partition 103 between the filaments is a complete barrier to the arc. The adjacent partition 113 has an opening at the opposite end of the lamp from the filaments and the next following partition 114 is open at the filament, the partition gap location alternating so that the arc is constrained to follow its zigzag path around the lamp through partitions 115, 116, and 117 to the other filament. The inner lamp envelope 118, which can be cylindrically shaped, is shown curved inward between partitions to strengthen the envelope, since glass has greater strength in compression than in tension.

Figure 15:
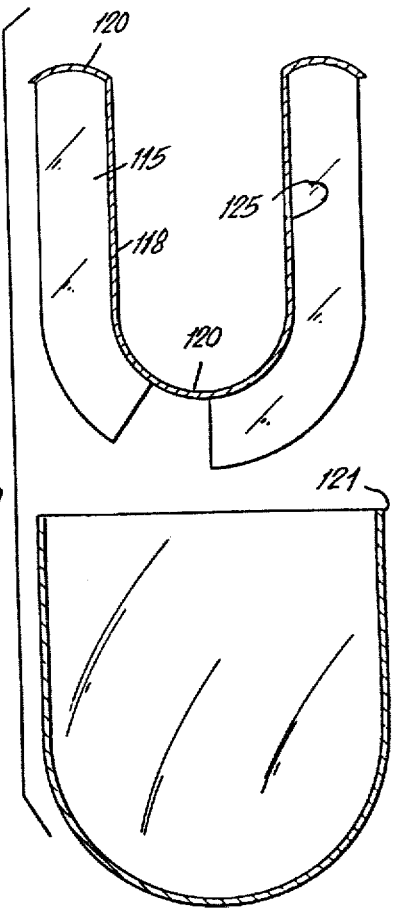
FIG. 15 is an exploded sectional view taken along the plane of line 15—15 in FIG. 12 illustrating the two sections from which the lamp is fabricated; and, FIG. 16 is a sectional detail view taken along the plane of line 16—16 in FIG. 12.

The lamp envelope is made, by glass blowing machinery, in two pieces, as can be seen best in FIG. 15, with an inner section 120 comprising the inner wall 118 and the partitions. The outer envelope 121 is then sealed to the inner section. Accurate mating of the two units is not required and tight seal of the partitions to the outer wall is readily and routinely completed. In another embodiment, the lamp envelope, together with the partitions, is formed in a pressed glass die to which the bottom glass surface of the lamp is sealed. The lamp, when sealed, customarily contains 1-4 torr of Argon plus sufficient mercury vapor, approximately 10 microns, to form the arc discharge.

Figure 13:
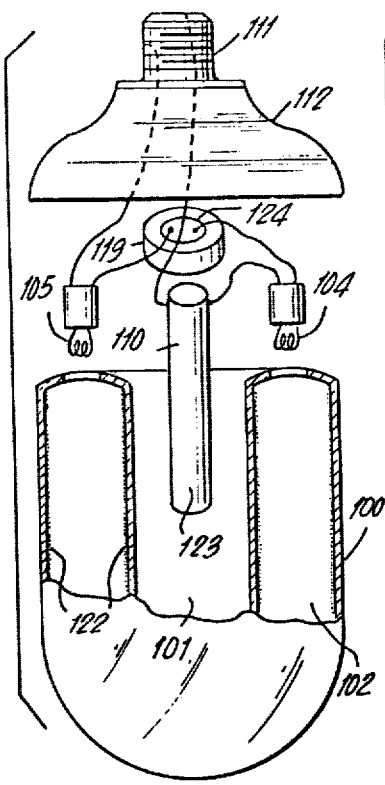
FIG. 13 is an exploded view of the lamp showing the ballast and lamp circuitry housed inside the hollow center of the lamp.

The interior cavity of this lamp, FIG. 13, contains the arc spreading coil 110, which also serves as the ballast, located in the center of the cavity. The arc spreading coil/ballast is connected to the associated circuit 119, containing the starter 124, and connections from the filaments 104, 105 and the screw-in plug 111. The screw-in plug 111 is cemented to the lamp by a bezel 112 under which the associated circuitry is housed. The ballast is specially designed as to length and windings and is housed in a case of non-ferrous material which permits the magnetic field of the coil to extend throughout the glass envelope of the lamp and provides a high voltage starter pulse to initiate the arc discharge when the current flow through the starter is interrupted. The arc spreading coil/ballast 110 produces a high voltage pulse which initiates the arc as in conventional fluorescent lamps.

An increase in luminous output is achieved by coating the inside envelope with a reflective material 125 to reflect light coming to the interior of the lamp back to the outside of the lamp envelope. Alternatively, the same goal is achieved by making the ballast case with a reflective outer surface.

The magnetic field of the arc spreading coil, in concert with the alternating current, diverges outwards from the pole pieces, expanding and contracting, causing the arc discharge to move in a direction perpendicular to both the magnetic and electric fields. By the choice of coil design, the arc current will spread, throughout the entire volume of the lamp. Selection of the proper number of ampere turns in the arc spreading coil spreads the arc up to and within the confines of the lamp envelope.

The voltage across the arc is constant and the voltage gradient is constant and based upon the parameters of lamp construction, argon gas pressure, mercury vapor temperature, etc. The current through the arc is held relatively constant by the external circuitry of the lamp. Little or no change in total lamp current is noted when the arc spreading coil is energized. In the conventional fluorescent lamp, the arc has its greatest current density at the center of an arc of approximately circular cross section and this current density diminishes rapidly outward. The current in the center of the arc contributes less toward energizing the phorphor and producing light since radiation produced in that region is likely to encounter ground state mercury atoms and be absorbed before the phosphor is reached. This is called imprisonment of radiation or radiative absorption. When an arc spreading coil is energized, the current density pattern is diffused as the arc spreads. Since total current remains unchanged but the local current density is more uniform bringing the arc closer to the lamp wall, decreasing losses due to radiative absorption. By this means, an arc spreading coil increases light output as measured in lumens/watt, increases lamp efficiency. Arc spreading frees the lamp designer from the constraint of a long, tubular cylindrical envelope. Such long tubes maintain the center of the arc at the optimum distance from the phosphor, approximately 20 mm ($\frac{3}{4}$") in a diameter of 38 mm. With magnetic field arc spreading, the space between partitions in the lamp can be greater than 38 mm while maintaining effective light output from the arc discharge with a phosphor uniformly and evenly emitting light from all lamp surfaces.

The result is a compact, double cylinder or globular shape of the screw-in fluorescent lamp with an internal arc spreading coil.

Thus, fewer partitions need to be used to contrain the arc path providing freedom to select path length, arc current, and lamp wattage upon consideration of desired lumen output for any given lamp shape and size. For example, the lamp design shown with one partition on the outer glass wall, the phosphor is fully energized as would be true also were more partitions present. The efficacy of the action of the special ballast in this invention increases as the power frequency is raised. Arc spreading techniques permit the manufacture of lamps of high wattages in compact cylindrical and semispherical configuration. The invention described herein can be operated at power line frequencies and up to 30 KHz and higher.

The circuitry for the ballast is well known at lower power frequencies. At high frequencies, solid state circuits are also known to the art. Here, the ballast core is customarily of ferrite material and considerably lighter. Whatever the line frequency, instant starting of the fluorescent lamp is achieved by the application of a high voltage of approximately 1,000 volts to the filament from the starting circuit by ballast winding design.

We claim:

1. A method of producing spreading of the arc discharge in a fluorescent lamp wherein said arc discharge is spread throughout the volume of the lamp envelope by an arc spreading coil comprising the step wherein said arc spreading coil creates a diverging magnetic field within the path of said arc discharge spreading the arc discharge throughout the volume of the lamp envelope.

2. A fluorescent lamp comprising an outer envelope defining a chamber containing electrodes to form an arc discharge, a luminescent phosphor coating all the interior walls of said chamber, ballast and circuitry means in said chamber and operatively connected to said electrodes, and arc spreading coil means for creating a diverging magnetic field at right angles to the direction of said arc discharge and within the path of said arc discharge so that said arc discharge is spread throughout the volume of said chamber.

3. A fluorescent lamp as in claim 2, wherein said arc spreading coil means includes means for producing a rotating magnetic field and includes two pairs of poles at right angles to each other.

4. A fluorescent lamp according to claim 3, wherein said pairs of poles comprise at least a part of the ballast for said fluorescent lamp.

5. A fluorescent lamp according to claim 2, wherein said arc spreading coil means includes multiple pole pieces having a pole piece pair shaded by shorted turns to produce a rotating magnetic field.

6. A fluorescent lamp according to claim 5, wherein said arc spreading coil means comprises at least a part of said ballast for said fluorescent lamp.

7. A fluorescent lamp according to claim 2, wherein said arc spreading coil means includes windings energized in phases to produce a uniformly rotating diverging magnetic field.

8. A fluorescent lamp according to claim 7, wherein said arc spreading coil means comprises at least part of the ballast for said fluorescent lamp.

9. A fluorescent lamp as in claim 7, wherein said rotating magnetic field operates at any power line frequency to cause arc spreading in said fluorescent lamp.

10. A fluorescent lamp according to claim 2, wherein said arc spreading coil means includes a pair of poles at right angles to each other for producing a rotating magnetic field.

11. A fluorescent lamp according to claim 10, wherein said arc spreading means is at least a part of the ballast for said fluorescent lamp.

12. A fluorescent lamp according to claim 2, wherein the arc spreading coil comprises at least a part of the ballast for said fluorescent lamp.

13. A fluorescent lamp according to claim 2, wherein said arc spreading coil has a core cooperating at any power line frequency so as to create a diverging magnetic field to cause arc spreading in said fluorescent lamp.

14. A fluorescent lamp as in claim 2, wherein said lamp operates at any power line frequency wherein the arc is spread throughout the volume of said lamp by said arc spreading coil which creates an alternating magnetic field at the same frequency as the power line frequency and at right angles to the arc path.

* * * * *